United States Patent Office 2,825,701
Patented Mar. 4, 1958

2,825,701

CATALYST FOR THE PRODUCTION OF OLEFINIC OXIDES

Harry Hermann Alfred Endler and Eugenio Bulgarelli, Ferrara, Italy, assignors to Montecatini, Società Generale per l'Industria Mineraria e Chimica, a corporation of Italy No Drawing. Application August 3, 1954
Serial No. 447,664

Claims priority, application Italy August 8, 1953

7 Claims. (Cl. 252—475)

The present invention relates to the production of olefinic oxides and to the preparation of a carrier-based silver catalyst for the catalytic oxidation of olefines to form olefinic oxides, particularly for the oxidation of ethylene to form ethylene oxide.

The direct combination of ethylene with oxygen (also with atmospheric oxygen) can be effected with mixtures containing a wide range in the ratio between air and ethylene by using suitable catalysts, such as, for example, finely divided silver or silver oxide.

Ethylene oxide is obtained from a partial oxidation of ethylene. Unfortunately, however, part of the oxidation goes to completion, resulting in large amounts of carbon dioxide and water, aside from other secondary reaction products such as aldehydes, etc. From the mixture of these reaction products, ethylene oxide can be separated in various ways.

One undesirable effect of the last-named "parasitic reactions" is the formation of "hot spots," resulting in the complete oxidation of ethylene to $CO_2+H_2O$.

In order to properly control the course of the reaction, numerous methods have been proposed, particularly in connection with the use of silver as a catalyst which, in form a fine dispersion, is practically the only suitable catalytic compound for this process.

To this end, the thermic decomposition of silver compounds has been proposed as a means of securing very fine particles of silver. The addition of limited amounts (5% as a maximum) of ground pulverulent substances (promoters) to the silver is to aid in maintaining the silver particles in a condition of greater subdivision (dispersion) when supported by a porous material. However, even this method is inadequate for satisfactory results.

Catalysts of this type have the disadvantage that a purely mechanical mixing of silver with dispersing agents or a deposition of thermic decomposition of silver compounds upon porous material do not guarantee that the fine subdivision will be maintained for a long time under the high temperature conditions to which the catalytic surface is exposed during the synthesis of ethylene oxide.

With the hitherto known catalysts, variations of the catalytic activity cannot be avoided. Such variations are caused by sintering or other altering processes which take place upon extended use or under the influence of excessive heat.

It is an object of the present invention to prepare a new silver catalyst which, when used in the catalytic oxidation of ethylene, is free from the above-mentioned disadvantages but, on the contrary, shows a decidedly superior activity in comparison with known catalysts from the very first moment of its use and, above all, maintains this superior activity for a long time and under heavy production charges. It is a further object of this invention to furnish a suitable carrier for the catalyst and a method of depositing the catalytic powder upon the carrier. It is a specific object of the present invention to prepare a low price catalyst possessing excellent mechanical properties as well as a high volumetric efficiency whereby the catalyst, because of its selective activity, produces increased yields of ethylene oxide when used in the direct oxidation of ethylene.

Further objects and advantages will appear from the following detailed description and the examples, illustrating the preferred manner of preparing and using the herein-claimed catalyst.

The catalyst of this invention is prepared in a simple and practical manner by co-precipitating a silver salt from the aqueous solution of a silver salt, together with an excess of another inert substance which, upon precipitation, forms particularly fine crystals. Such a substance should neither tend to sinter or to dissociate at high temperatures, and should be practically stable up to 600° C.

These requirements are primarily met by the alkaline-earth carbonates, although the invention is not restricted to these compositions. If, for example, silver carbonate and calcium carbonate are precipitated together under suitable conditions, a co-precipitate is obtained which, after drying, constitutes a conglomerate of extremely fine particles having an average diameter equal to, or smaller than, 5 microns. The silver and alkaline-earth salts to be used for precipitating the carbonates must be free from or substantially free from impurities acting upon silver as catalytic poisons such as, for instance, chlorine and sulfur. Small quantities of chlorine within conventional purity limits are allowable, however.

The catalytic powders produced in this manner, consisting of silver carbonate and alkaline-earth carbonates, may be used as they are, for example pressed into tablet form, or they may be embedded within natural or artificial porous aggregates such as quartz, alundum and, particularly, carborundum refractory materials. The powder is caused to adhere to the carrier, according to common practice, by soaking the carrier in a suspension of the powder and causing the liquid portion of the suspension to evaporate.

However, an improved catalyst is prepared when the catalytic powder is caused ot adhere to, and penetrate into, the interstices of the porous carrier by means of a special procedure which is a still further object of the present invention.

To this end, the co-precipitated powder, consisting of silver carbonate with at least 60% of calcium carbonate, is suspended in a mixture of water and a polyvalent alcohol such as ethylene glycol, and is caused to adhere to the porous carrier material by means of a suitable treatment, for instance by stirring grains of the carrier material into the suspension and removing excess liquid by filtering under vacuum.

The moist catalyst grains, obtained in this manner, are placed in a drying oven and are heated, from ½ to 3 hours, to a temperature between 200° and 500° C. This thermic treatment for the catalytic activation of the silver co-precipitate differs from the known thermic processes of decomposing silver compounds, primarily because the dissociation of the silver carbonate is checked in the presence of the evaporating liquid while, at the same time, an activating reduction to silver oxide is effected by reaction with the polyvalent alcohol, which results in a particularly efficacious product.

The addition of a polyvalent alcohol has another beneficial result, namely to cause an intimate penetration of the co-precipitants into even the most minute interstices of the carrier material, due to the property of polyalcohols of lowering the surface tension of water.

Obviously, the penetration of the material into the interstices of the carrier is made possible only by the state of extreme fineness (5 microns or less) of the co-precipitated powder of silver- and calcium-carbonate.

In this way, catalyst grains are obtained with a homogeneous distribution of catalytic powder on and within the carrier material, and with excellent adherence of the powder to the carrier.

This property of the catalyst is particularly important when charging the reactor with the catalyst, since it substantially eliminates the loss of active catalytic powder from the carrier due to shock or friction.

Catalysts prepared in the foregoing manner have the further advantages of possessing superior oxidation activity, particularly with respect to the olefines, together with a high selectivity, probably due to the greatly increased total surface area of the spherical silver particles.

The catalysts show immediately highest efficiency without the need of further conditioning. Although they can be used without detriment at a relatively high temperature, they give particularly good conversions and produce high synthesis yields at low temperatures, such as slightly above 200° C.

For instance, if a mixture of gas containing ethylene and oxygen at the usual proportion for direct catalytic oxidation is caused to pass through a bed of the herein-claimed catalysts, at the relatively low temperature of 220 to 230° C., 55% and more of the ethylene is changed into ethylene oxide during a single passage, while less than 25% is completely oxidized to carbon dioxide and water, so that the yield exceeds 70%. Moreover, the production remains constant for a period of several months.

In addition, the high preference of producing ethylene oxide makes the catalysts of this invention particularly suitable for employment in synthetic processes conducted under pressure. The greatest difficulty in pressure synthesis consists, generally, in maintaining strict control of the reaction temperature because of the heat liberated in the process, the greater part of which results from the complete combustion of the olefines. For this reason, when operating under pressure with previously known catalysts, there was always the danger of local overheating of the catalyst granules with the dreaded change to parasitic reactions. Prior investigators have proposed the addition of steam or other gases as reaction moderators. With the catalysts of the present invention, no such expedients are necessary because, in view of the low ratio of carbon dioxide formation and a more efficient distribution of the thermic gradients through the catalytic mass, the problem of overheating is completely solved.

Thus, by operating under pressure with the new catalysts, it is possible to increase production to a multiple of that attainable under atmospheric pressure.

A further advantage of these new catalysts, particularly from the economic point of view, is the rather moderate amount of silver required to produce the aforesaid results. 50 to 100 gr. of silver are sufficient for the preparation of a 1000 ccm. measure of the granulated catalyst. Of course, this statement is not to be taken as limiting the amount of silver in the catalyst compositions of this invention.

In the following examples, the term "spatial velocity" indicates the number of volumes of gas, measured at atmospheric pressure and standard temperature, which, during a given time pass through a bed of the catalyst of a given volume.

*Example 1*

20 gr. of silver nitrate are dissolved in 200 ccm. of water and a silver carbonate precipitate is formed while stirring, by adding 62 ccm. of a 10% aqueous sodium carbonate solution. The precipitate is thoroughly washed with water, filtered and oven-dried at 108° C. The resulting silver carbonate powder is suspended in water, together with a 100 ccm. measure of a granular, siliceous refractory material of a grain size suitable for catalytic purposes. While continuously stirring, the mixed suspension is evaporated to dryness on a water bath.

At a spatial velocity of 300 liters/hour and a contact time of about 7 seconds, a mixture of ethylene-air, containing 3% ethylene, is passed over 100 ccm. of the catalyst prepared in this manner, whereby the catalyst is maintained at a reaction temperature of 200 C. The conversion of ethylene to ethylene oxide is equal to 9.1% with a yield of 36.2%.

*Example 2*

20 gr. of silver nitrate are dissolved in 200 ccm. of water and a silver carbonate precipitate is formed, while stirring, by adding 62 ccm. of a 10% aqueous sodium carbonate solution. The precipitate is thoroughly washed with water, filtered and oven-dried at 108° C. The resulting silver carbonate powder is placed into a vitreous glass funnel and mixed into a suspension with 50% aqueous glycol and a 100 ccm. measure of a siliceous refractory material of a grain size suitable for catalytic purposes. This operation is performed in such a manner that, while the refractory material is intimately mixed with the catalyst, the excess liquid is eliminated by applying a slight suction to the funnel. The refractory material thus covered with moist silver carbonate is placed into a muffle oven and heated to 400° C. for an hour.

A mixture of ethylene and air, containing 3% of ethylene, is passed over 100 ccm. of the catalyst prepared in this manner, at a spatial velocity of 330 liters/hour and a contact time of 7 seconds, whereby the catalyst is maintained at a reaction temperature of 200° C. The conversion of ethylene to ethylene oxide amounts to 15.3%, with a 37.4% yield.

*Example 3*

20 gr. of silver nitrate are dissolved in 200 ccm. of water and a silver carbonate precipitate is formed, while stirring, by adding 62 ccm. of a 10% aqueous sodium carbonate solution. The precipitate is thoroughly washed with water, filtered and dried in an oven at 108° C. In the meantime, 80 gr. of crystalline calcium nitrate are dissolved in 800 ccm. of water and precipitated, while stirring, with 359 ccm. of the 10% sodium carbonate solution. The calcium carbonate precipitate is washed, filtered and also dried in an oven at 108° C. The silver- and calcium-carbonates are ground and mixed, whereby 45 gr. of a pulverulent mixture are obtained. This powder is suspended in water and 100 gr. of a siliceous refractory material of a grain size suitable for catalysts are added. While continuously stirring, the mixture is then evaporated to dryness on a water bath.

An ethylene-air mixture containing 3% ethylene is passed over 100 ccm. of the catalyst prepared in this manner, at a spatial velocity of 330 liters/hour and a contact time of about 7 seconds, whereby the catalyst is maintained at a reaction temperature of 210° C. The conversion of ethylene to ethylene oxide amounts to 14.2%, with a 36.2% yield.

*Example 4*

20 gr. of silver nitrate are dissolved in 200 ccm. of water and a silver carbonate precipitate is formed, while stirring, by adding 62 ccm. of a 10% aqueous solution of sodium carbonate. After thorough washing, the precipitate is filtered and dried in an oven at 108° C. In the meantime, 80 gr. of calcium nitrate are dissolved in 800 ccm. of water and precipitated, while stirring, with 359 ccm. of a 10% aqueous solution of sodium carbonate. The calcium carbonate precipitate is washed, filtered and also oven-dried at 108° C. The two powders, silver- and calcium-carbonate, are ground and mixed together, whereby 45 gr. of a pulverulent mixture are obtained. The mixed powder is placed into a vitreous glass funnel and mixed into a suspension with 50% aqueous ethylene glycol and 100 ccm of a siliceous refractory material of a grain size suitable for catalysis.

The operation is carried out in such a manner that, while the refractory material is intimately mixed with the catalyst, the excess liquid is eliminated by applying a slight suction to the vitreous glass funnel. The refractory material thus covered with powder is placed into a muffle oven and heated to 400° C. for one hour.

A mixture of 3% ethylene with air is passed over 100 ccm. of the catalyst prepared in this manner, at a spatial velocity of 330 liters/hour and about 7 seconds contact time, whereby the catalyst is maintained at a reaction temperature of 210° C.

The conversion of ethylene to ethylene oxide amounts to 24%, with a yield of 33%.

Example 5

20 parts of silver nitrate and 80 parts of calcium nitrate are dissolved together in 1000 parts of water. To this solution, 42 parts of a 10% solution of sodium carbonate are dropwise added while stirring. Upon completion of the precipitation, the precipitate is separated by means of a vitreous glass funnel under vacuum and is washed several times, while vigorously stirring, until the wash water has a pH of 6.5. After drying the precipitate in an oven at 108° C., 45 parts of powdery material are obtained.

To the powder, suspended in water, 100 ccm. of a granulated siliceous refractory material are added and the mixed suspension is heated to dryness while stirring on a water bath. The catalyst grains obtained in this manner are ready for use after heating in a muffle oven at 400° C. A mixture of ethylene-air comprising 3% ethylene is passed over 100 cm. of the catalyst prepared in this manner, at a spatial velocity of 330 liters/hour, while the catalyst is kept at a reaction temperature of 220° C.

The conversion of ethylene to ethylene oxide amounts to 34%, with a 58.5% yield.

Example 6

From an aqueous solution containing silver nitrate and calcium nitrate at a molar ratio of 4:1, silver and calcium carbonate is precipitated according to the procedure of Example 5. After washing and filtering, the precipitate is dried in an oven at 108° C. 45 gr. of the dry catalytic powder are placed in a vitreous glass funnel and are mixed into a suspension with a 50% aqueous ethylene-glycol solution and 100 ccm. of granulated green carborundum having a particle size of about 3 mm. in diameter. The operation is carried out in such a manner that the excess liquid is eliminated by applying a light vacuum to the filtering funnel while the carborundum is intimately mixed with the catalyst. The carborundum is thus homogeneously covered with the catalyst powder. The grains are then introduced into a muffle oven and heated for an hour to 400° C. During this treatment, water or water-glycol vapors developed, containing oxidation products of the glycol from the reaction with the silver compounds; care must be taken that this atmosphere be maintained over the catalyst until the end of the heating.

In this manner, homogeneous grains of a catalyst are obtained, in which the adherence of the catalytic powder to the carborundum base is excellent. A mixture of ethylene-air containing 3% ethylene is passed over 100 ccm. of the catalyst at a spatial velocity of 330 liters/hour, while the catalyst is maintained at 210° C. A 45% conversion to ethylene is obtained, at a 65% yield.

Example 7

A catalyst prepared according to the method of Example 6 is charged into a reaction tube 300 cm. long and 12 mm. in diameter. Upon passing through this tube an ethylene-air mixture containing 3–4% ethylene, at a spatial velocity equal to 410 liters/hour under atmospheric pressure and at a reaction temperature of 230° C., 55% of the ethylene employed is converted to ethylene oxide in a single passage at a yield in excess of 70%.

Example 8

By operating according to Example 7 but increasing the spatial velocity to 820 liters/hour, the conversion to ethylene oxide falls to 50% while the yield is about the same as in Example 7, i. e. in excess of 70%.

Example 9

An ethylene-air mixture containing 3–4% ethylene is passed, at a spatial velocity of 1750 liters/hour, over 2000 ccm. of catalyst, prepared according to the method of Example 6, and contained in a reactor 300 cm. long and maintained at a temperature of 220° C.

When operating under a pressure of 10 atm., 50% of the ethylene fed to the reactor is converted to ethylene oxide by means of a single pass, while 21% of the ethylene is completely oxidized to carbon dioxide and water.

Example 10

The catalyzer efficiency does not change during a continuous test covering a period of over 3000 hours and under operating conditions as set forth in Example 6.

Upon comparing the differently made catalysts, it is evident that the preparations according to Examples 1, 2, 3 and 4, comprising a separate precipitation of the silver carbonate and calcium carbonate from the respective nitrate solutions, constitute catalytic masses which are not of sufficiently small particle size to possess the desired activity. The results are a low conversion factor and small yields. Conversely, by operating according to the herein-claimed process as disclosed in Examples 5, 6, 7, 8, 9 and 10, the co-precipitation of silver and calcium carbonate results in extremely minute and uniform particles which, after deposition on and within the granulated carrier, exhibit a very high catalytic activity, resulting in conversion factors and yields in excess of 55 and 70%, respectively.

When preparing the catalyst by mixing, say, a silver nitrate solution with a calcium nitrate solution in order to co-precipitate the two metals in form of their carbonates, the silver nitrate and calcium nitrate should be present in the mixture at a molar ratio between 1:1 to 1:4, preferably exceeding a ratio of 1:1.5.

Our preferred carrier for the catalytic silver compound consists of carborundum aggregates of uniform particle size, which are more than 2 mm. and, preferably, 3 mm. in diameter.

The quantity of silver carbonate-calcium carbonate co-precipitate deposited on and within the carrier may range from 15 to 75 gr. but is, preferably, about 45 gr. for every 100 ccm. measure of a granulated carrier having a particle size of 3 mm. Broadly speaking, the quantity of deposited co-precipitate will change with the particle size of the carrier. If the weight ratio between calcium carbonate and silver in the catalytic mixture is about 2.7:1, approximately one-fourth of the mixture consists of silver. Consequently, the catalyst carrier contains 5 to 15 gr. but, preferably, about 10 gr. of silver for every 100 ccm. measure thereof.

The particle size of the mixed catalyst powder made according to this disclosure is 5 microns and less. Consequently, the adherence of the powder to the surface of the carrier and within the interstices of the carrier is excellent. Thus, if a quantity of the finished catalytic material is dropped from a height of 3 meters, the amount of catalytic powder separated from the granular carrier is practically negligible.

The catalytic activity of the herein claimed product is such that a 100 ccm. measure of the catalyst containing about 10 gr. of silver, is capable of oxidizing within one hour about 300 gr. of ethylene to ethylene oxide. The temperature of this catalytic oxidation may range from 180 to 300° C., but is preferably held between 200 and 250° C. when using an oxygen/ethylene ratio ranging from 10:1 to 1:1.

Therefore, in subdividing a silver salt into super-fine particles of an average size not exceeding 5 microns, by co-precipitating the silver salt with a dispersing agent and by subsequently thermically activating the precipitate, we have suceeded in furnishing a catalyst having a reactive surface area which is far in excess of that of prior, similar catalysts.

The comminution of the silver precipitate, as well as the homogeneous and efficient dispersion of the particles, is attained by co-dispersing at least an equimolar amount, but preferably an excess, of calcium carbonate with silver carbonate in a fluid dispersion medium and removing the fluid dispersion medium to obtain a solid dispersion of silver carbonate in a calcium carbonate powder of equally small particle size.

Moreover, by employing an ethylene glycol solution as the dispersion fluid, porous carborundum particles as carrier and heat-activation of the silver compound in an ethylene glycol atmosphere, we have succeeded in attaining increased adherence to, and penetration of, the silver compound into the interstices of the carrier while the silver carbonate is changed into the more active silver oxide.

The resulting catalyst is superior to prior, similar catalysts not only in producing ethylene oxide at an increased conversion ratio and higher yield because of its selective action, but in displaying increased physical stability, greater resistance to high temperatures and pressures and exceptionally high stability in operation, coupled with a substantial reduction in the quantity of silver required for a given production output.

We claim:

1. A process for preparing a carrier-based silver catalyst suitable for the catalytic oxidation of olefines, comprising the steps of preparing an aqueous solution containing a silver salt and an alkali earth salt at a molar ratio from 1:1 to 1:4, dropwise adding, while stirring, a sodium carbonate solution to co-precipitate silver carbonate and alkali earth carbonate, washing the co-precipitate until the wash water has a pH of 6.5, drying the co-precipitate, forming a suspension of the co-precipitate in an aqueous solution of a member of the group consisting of glycerol and ethylene glycols mixing a granular, porous refractory material into the suspension, causing the co-precipitate to adhere to the refractory material by vacuum filtering said aqueous solution, and heating the coated refractory material to between 200 and 500° C. in an atmosphere of said polyhydric alcohol for ½ to 3 hours.

2. A process for preparing a carrier-based silver catalyst suitable for the catalytic oxidation of olefines, comprising the steps of preparing an aqueous solution containing about 2% of silver nitrate and about 8% of calcium nitrate, dropwise adding, while stirring, a 10% aqueous solution of sodium carbonate to co-precipitate silver carbonate and calcium carbonate, washing the co-precipitate until the wash water has a pH of 6.5, drying the co-precipitate at about 108° C., forming a suspension of the co-precipitate in a 50% aqueous solution of ethylene glycol, mixing granular carborundum aggregates of a particle size of about 3 mm. into the suspension, causing the co-precipitate to adhere to the carborundum aggregates by vacuum filtering said aqueous ethylene glycol solution, and heating the coated carborundum aggregates for about 1 hour to 400° C. in an atmosphere of ethylene glycol.

3. A carrier-based silver catalyst for the catalytic oxidation of olefines to olefine oxides, consisting of granulated, porous siliceous refractory material as the carrier and a coating which penetrates into the interstices of said material and consists of a homogeneous mixture of decomposition products of silver carbonate and at least 50% of an alkali earth carbonate, each 100 cc. of said material containing an amount of said decomposition products of silver carbonate comprising 5–15 gr. of silver.

4. A carrier-based silver catalyst for the catalytic oxidation of olefines to olefine oxides, consisting of granular, carborundum aggregates of a particle size from 2 to 3 mm. as the carrier and a coating of a homogeneous mixture of 20–30% of decomposition products of silver carbonate and 80–70% of calcium carbonate, said mixture having a particle size of not more than 5 microns, each 100 ccm. of aggregates containing an amount of said decomposition products of silver carbonate comprising about 10 gr. of silver.

5. A carrier-based silver catalyst for the catalytic oxidation of olefines to olefine oxides, consisting of granular carborundum aggregates of a particle size of about 3 mm. as the carrier and a coating which penetrates into the interstices of said aggregates and consists of a homogeneous mixture of 20–30% of decomposition products of silver carbonate and 80–70% of calcium carbonate, said mixture having a particle size of not more than 5 microns, each 100 ccm. of aggregates containing an amount of said decomposition products of silver carbonate comprising about 10 gr. of silver.

6. A carrier-based silver catalyst for the catalytic oxidation of olefines to olefine oxides, consisting of granular, porous refractory material of a particle size of about 3 mm. as the carrier, coated with a homogeneous mixture of 1 part of decomposition products of silver carbonate and about 2.7 parts of calcium carbonate, each 100 ccm. of said granular refractory material containing 15 to 75 gr. of said coating.

7. A carrier-based silver catalyst for the catalytic oxidation of olefine to olefine oxides, consisting of granular carborundum aggregates of a particle size of about 3 mm. as the carrier, coated with a homogeneous mixture of 1 part of decomposition products of silver carbonate and about 2.7 parts of calcium carbonate, the particle size of said homogeneous mixture being about 5 microns and each 100 ccm. of said carborundum aggregates containing about 45 gr. of said coating.

References Cited in the file of this patent

UNITED STATES PATENTS

| | | |
|---|---|---|
| 2,164,826 | Langwell | July 4, 1939 |
| 2,238,474 | McNamee | Apr. 15, 1941 |
| 2,426,761 | Cambron et al. | Sept. 2, 1947 |
| 2,605,239 | Sears | July 29, 1952 |